US006532649B1

(12) United States Patent
Campbell et al.

(10) Patent No.: US 6,532,649 B1
(45) Date of Patent: Mar. 18, 2003

(54) CRIMPING MACHINE

(75) Inventors: Bruce M. Campbell, Mattituck, NY (US); Hershell P. Sablowski, Patchogue, NY (US)

(73) Assignee: Edwin B. Stimpson Company, Inc., Bayport, NY (US)

( * ) Notice: Subject to any disclaimer, the term of this patent is extended or adjusted under 35 U.S.C. 154(b) by 0 days.

(21) Appl. No.: 09/584,042

(22) Filed: May 30, 2000

(51) Int. Cl.[7] .................................................. B23Q 7/10

(52) U.S. Cl. ....................... 29/818; 29/281.4; 29/283.5; 72/421

(58) Field of Search .......................... 29/505, 508, 559, 29/818, 243, 243.5, 281.4, 283.5, 469.5; 72/420, 421; 279/83

(56) References Cited

U.S. PATENT DOCUMENTS 2,287,882 A * 6/1942 Huff ............................ 279/83
2,338,095 A * 1/1944 Campbell .................... 279/83
2,338,626 A * 1/1944 Emrick ........................ 279/83
4,265,057 A * 5/1981 Hoffman ...................... 279/83
5,865,078 A * 2/1999 Langford ..................... 81/441

* cited by examiner

*Primary Examiner*—David P. Bryant
*Assistant Examiner*—Jermie E. Cozart
(74) *Attorney, Agent, or Firm*—Galgano & Burke

(57) ABSTRACT

A crimping tool according to the invention includes a cylindrical C-5 carbide rod having a plurality of laser cut pyramid points on one end. An adapter sleeve is also provided for attaching the tool to an existing pneumatic press. The pyramid pattern on the end of the tool provides several unexpected benefits. First, the points engage the eyelet and prevent the tool from slipping off the eyelet during the crimping operation. Second, the crimps produced by the tool have a greater surface area than the conventional crimps, exerting more pressure on the wick core without shearing fibers. The pressure exerted on the wick is 25–35% greater than a conventional crimp. Further, the carbide material wears much slower than the conventional crimping tools. This assures a consistency in crimping over a long period of time. An exemplary embodiment of the crimping tool according to the invention is approximately 1.625 inches long and approximately 0.090 inches in diameter. Five pyramids are cut into one end of the tool in a+pattern. Each pyramid has a base which is approximately 0.030 inches square and an altitude of approximately 0.030 inches.

8 Claims, 2 Drawing Sheets

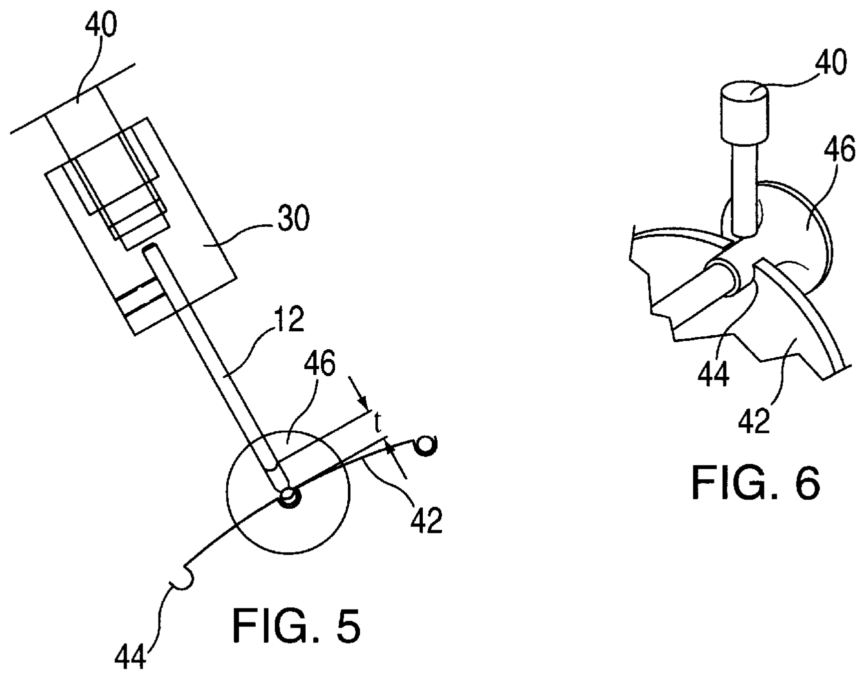
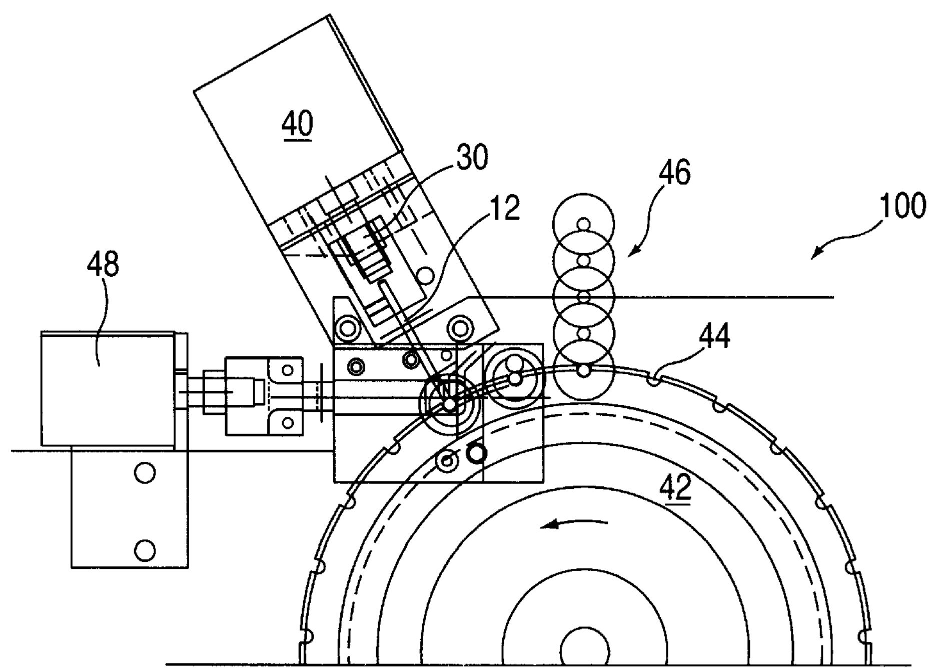
FIG. 7

CRIMPING MACHINE

This application is related to co-pending applications Ser. No. 09/584,041 new still pending entitled "Method and Apparatus for Impregnating a Candle Wick with Candle Wax", Ser. No. 09/584,043, new U.S. Pat. No. 6,481,997 entitled "Multi-Part Candle Wick Die Plates", and Ser. No. 09/992,323, now abandoned entitled "Clip Disk Assembly for Carrying Candle Wick Eyelets", all filed simultaneously herewith, the complete disclosures of which are hereby incorporated by reference herein.

BACKGROUND OF THE INVENTION

1. Field of the Invention

The invention relates to the manufacture of candles. More particularly, the invention relates to the manufacturing of a wax impregnated candle wick. Most particularly, the invention relates to a crimping tool used in the manufacture of a wax impregnated candle wick for attaching an eyelet to the wick.

2. State of the Art

It is well known in the art of candle making to pass a wick material through a bath of molten candle wax to impregnate the wick with wax. In the mass production of candles, a continuous string of wick material (cotton, paper, or other material) is fed through a series of operations including bathing the wick in molten wax. The state of the art apparatus for bathing the wick material is usually a single idler pulley or grooved stud located below the surface of the molten wax bath. The wick material is guided by pulleys or grooved studs to the bath whereupon it is fed through the bath by traveling under the single idler pulley or grooved stud which is located beneath the surface of the molten wax. Upon exiting the bath, the wax impregnated wick is passed through one or more dies whereby excess wax is trimmed and the final diameter of the wick is determined. Finally, the semi-finished wick is fed to an eyelet crimping station. The wick is fed through the eyelet. The eyelet is crimped, and the wick is cut to size. The eyelet prevents the wick from passing through the bore of a candle which has been molded without the wick and then bored to accept the wick.

State of the art machines for crimping an eyelet to a candle wick include an indexed circular work station having a rotatable disk with a plurality of peripheral notches. The notches are dimensioned to hold the eyelets. As an eyelet is indexed to position, a wick is inserted and the eyelet is crimped by a pneumatically driven crimping tool. The crimping tool is a rectilinear rod which flattens one side of the eyelet. The state of the art crimping tools have several disadvantages. The tools easily become misaligned so that less than an ideal amount of the eyelet is crimped. If the tool is loose, it will slide over the round eyelet, barely crimping it at all. Moreover, the state of the art crimping tools wear quickly. As the tool wears, the crimping foot print changes and the quality of the crimps diminishes.

SUMMARY OF THE INVENTION

It is therefore an object of the invention to provide an improved crimping tool for securing an eyelet to a candle wick.

It is also an object of the invention to provide an improved crimping tool for securing an eyelet to a candle wick which avoids the disadvantages of the prior art.

It is another object of the invention to provide an improved crimping tool for securing an eyelet to a candle wick which provides secure crimps even if misaligned.

It is still another object of the invention to provide an improved crimping tool for securing an eyelet to a candle wick which is self-centering if it becomes loose.

It is yet another object of the invention to provide an improved crimping tool for securing an eyelet to a candle wick which can be used in an existing crimping station.

It is still another object of the invention to provide an improved crimping tool for securing an eyelet to a candle wick which is suitable for an assembly line manufacturing process.

In accord with these objects which will be discussed in detail below, the crimping tool according to the invention includes a cylindrical C-5 carbide rod having a plurality of laser cut pyramid points on one end. An adapter sleeve is also provided for attaching the tool to an existing pneumatic press. The pyramid pattern on the end of the tool provides several unexpected benefits. First, the points engage the eyelet and prevent the tool from slipping off the eyelet during the crimping operation. Second, the crimps produced by the tool have a greater surface area than the conventional crimps, exerting more pressure on the wick core without shearing fibers. The pressure exerted on the wick is 25–35% greater than a conventional crimp. Further, the carbide material wears much slower than the conventional crimping tools. This assures a consistency in crimping over a long period of time.

An exemplary embodiment of the crimping tool according to the invention is approximately 1.625 inches long and approximately 0.090 inches in diameter. Five pyramids are cut into one end of the tool in a+pattern. Each pyramid has a base which is approximately 0.030 inches square and an altitude of approximately 0.030 inches.

Additional objects and advantages of the invention will become apparent to those skilled in the art upon reference to the detailed description taken in conjunction with the provided FIGS.

BRIEF DESCRIPTION OF THE DRAWINGS

FIG. 5 is a broken schematic side elevational view of the tool installed in a crimping station;

FIG. 6 is a perspective detail of the tool in a crimping station; and

FIG. 7 is a schematic side elevational view of a crimping station incorporating the tool of the invention.

DETAILED DESCRIPTION OF THE PREFERRED EMBODIMENTS

Figure 1:
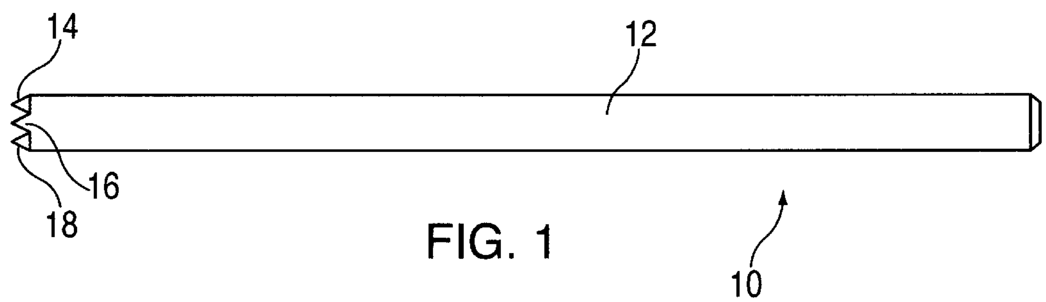
FIG. 1 is a side elevational view of a crimping tool according to the invention.
Figure 2:
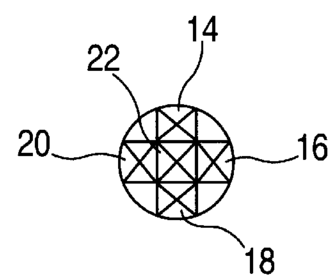
FIG. 2 is an end view of the tool of FIG. 1.

Referring now to FIGS. 1 and 2, the crimping tool 10 according to the invention includes a cylindrical C-5 carbide rod 12 having a plurality of laser cut pyramid points 14, 16, 18, 20, 22 on one end. An exemplary embodiment of the crimping tool 10 according to the invention is approximately 1.625 inches long and approximately 0.090 inches in diameter. Five pyramids are cut into one end of the tool in a+pattern. Each pyramid has a base which is approximately 0.030 inches square and an altitude of approximately 0.030 inches.

Figure 3:
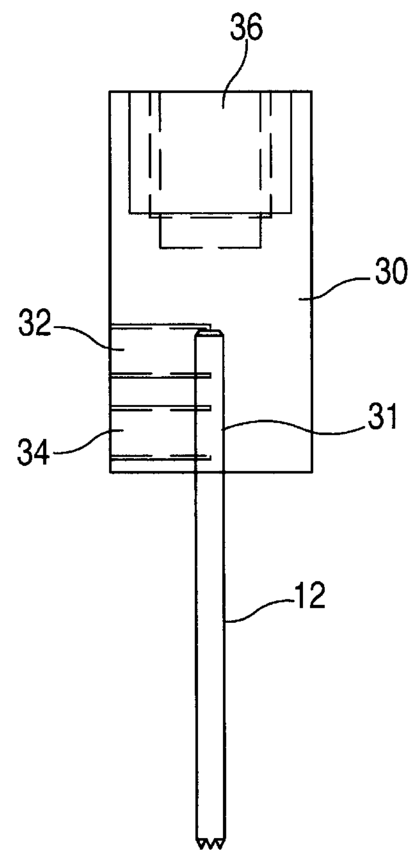
FIG. 3 is a partially transparent side elevational view of the tool of FIGS. 1 and 2 mounted in an adapter sleeve.
Figure 4:
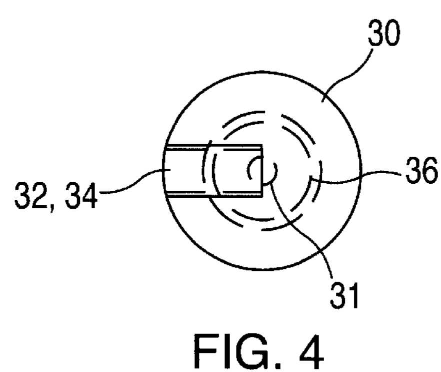
FIG. 4 is an end view of the adapter sleeve.

As shown in FIGS. 3 and 4, an adapter sleeve 30 is also provided for attaching the tool to an existing pneumatic press. The adapter sleeve includes a first axial bore 31 for receiving the crimping tool 12, a pair of radial bores 32, 34 for receiving set screws (not shown), and a second axial bore 36 for coupling to a pneumatic press.

Turning now to FIGS. 5 and 6, the tool 12 is shown schematically coupled to a pneumatic cyclinder 40 mounted adjacent to a rotating disk 42. The disk 42 has a plurality of peripheral notches 44 for carrying eyelets 46 from a supply to the crimping tool 12. When an eyelet is in position as shown in FIGS. 5 and 6, the pneumatic cyclinder 40 is activated to move the crimping tool 12 a distance "t" (FIG. 5) towards the neck of the eyelet 46. As seen in FIG. 5, the distance "t" is chosen so that the neck of the eyelet 46 is compressed to approximately half its original size.

The pyramid pattern on the end of the tool 12 provides several unexpected benefits. First, the points engage the neck of the eyelet and prevent the tool from slipping off the eyelet during the crimping operation. Second, the crimps produced by the tool have a greater surface area than the conventional crimps, exerting more pressure on the wick core without shearing fibers. The pressure exerted on the wick is 25–35% greater than a conventional crimp. Further, the carbide material wears much slower than the conventional crimping tools. This assures a consistency in crimping over a long period of time.

FIG. 7 illustrates the tool 12 of the invention installed in an existing crimping station 100. The crimping station 100 includes a pneumatic cyclinder 40, a rotating disk 42 with a plurality of peripheral notches 44, a supply of eyelets 46, and an apparatus for advancing and cutting wicks 48. The crimping tool 12 of the invention is retro-fitted to an existing crimping machine 100 via the adapter sleeve 30.

There has been described and illustrated herein a crimping tool for securing an eyelet to a candle wick. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A crimping machine for securing an eyelet to a candle wick, comprising:

a) a pneumatic press;

b) a rotatable disk adjacent to said pneumatic press, said disk having a plurality of peripheral notches;

c) means for placing said eyelet into one of said peripheral notches; and d) a substantially cylindrical rod having a first end and a second end, said first end having a plurality of pyramidal points, said second end being coupled to said pneumatic press, wherein rotation of said disk brings and a candle wick which has been inserted thereinto, adjacent to said substantially cylindrical rod, and activation of said pneumatic press advances said rod towards the eyelet such that the eyelet is crimped by said plurality of pyramidal points to secure said eyelet to said candle wick.

2. A crimping machine according to claim 1, further comprising:

e) an adapter sleeve coupling said substantially cylindrical rod to said pneumatic press.

3. A crimping machine according to claim 1, wherein:

each of said pyramidal points has a substantially square base.

4. A crimping machine according to claim 3, wherein:

said plurality of pyramidal points includes five points arranged in a cross-shaped pattern with one point defining the center of the cross and the four remaining points disposed adjacent to said one point and each defining a leg of said cross.

5. A crimping machine according to claim 4, wherein:

each of said points has an altitude approximately equal to a side of its base.

6. A crimping machine according to claim 5, wherein:

said substantially cylindrical rod is made of C-5 carbide.

7. A crimping machine according to claim 6, wherein:

said pyramidal points are formed by laser.

8. A crimping machine according to claim 7, further comprising:

f) means for advancing a candle wick into an eyelet and for cutting said wick to size.

* * * * *